United States Patent
Oyama et al.

[11] Patent Number: 6,158,861
[45] Date of Patent: Dec. 12, 2000

[54] PRISM BALLAST TYPE CONTACT LENS, METHOD OF PRODUCING THE SAME, AND MOLD ASSEMBLY USED IN PRODUCING THE LENS

[75] Inventors: Hiroyuki Oyama; Yuuzi Gotou, both of Kakamigahara, Japan

[73] Assignee: Menicon Co., Ltd., Nagoya, Japan

[21] Appl. No.: 09/259,766

[22] Filed: Mar. 1, 1999

[30] Foreign Application Priority Data

Mar. 9, 1998 [JP] Japan .................................. 10-56878

[51] Int. Cl.$^7$ ...................................................... G02C 7/04
[52] U.S. Cl. ........................ 351/160 R; 264/2.2; 351/175
[58] Field of Search .............................. 264/1.1, 2.5, 219, 264/1.32, 2.2; 351/159, 160 R, 161, 175, 177

[56] References Cited

U.S. PATENT DOCUMENTS

| | | |
|---|---|---|
| 4,113,224 | 9/1978 | Clark et al. . |
| 4,407,766 | 10/1983 | Haardt et al. . |
| 4,614,624 | 9/1986 | Neefe ........................................ 264/2.5 |
| 4,681,295 | 7/1987 | Haardt et al. . |
| 5,110,278 | 5/1992 | Tait et al. . |
| 5,371,976 | 12/1994 | Svochak . |
| 5,422,687 | 6/1995 | Tanaka et al. ............................ 351/161 |
| 5,611,970 | 3/1997 | Apollonio et al. . |
| 5,968,422 | 10/1999 | Kennedy ................................. 264/1.1 |

FOREIGN PATENT DOCUMENTS

| | | |
|---|---|---|
| 0 646 825 A1 | 4/1995 | European Pat. Off. . |
| 57-98324 | 9/1982 | Japan . |
| 2 082 957 | 3/1982 | United Kingdom . |

Primary Examiner—George Manuel
Attorney, Agent, or Firm—Burr & Brown

[57] ABSTRACT

A prism ballast type contact lens having a front and a back surface, a center axis of the front surface being offset from that of the back surface which is a geometric center axis of the lens, such that the lens has a thickness which continuously increases in a downward direction of the lens, the lens further having a slab-off area provided in at least a lower portion of the front surface, wherein at least an optical portion of the back surface and the lower portion of the front surface are formed by molding using a mold assembly including a male and a female mold half which are closed to define a mold cavity that gives a lens blank which is formed into the prism ballast type contact lens, the male mold half having a convex molding surface whose profile follows that of the optical portion of the back surface, the female mold half having a concave molding surface whose profile follows that of at least the lower portion of the front surface, the mold cavity being defined by the convex and concave molding surfaces, so as to provide the lens blank having a thickness sufficient to give at least an optical portion of the front surface by cutting.

10 Claims, 3 Drawing Sheets

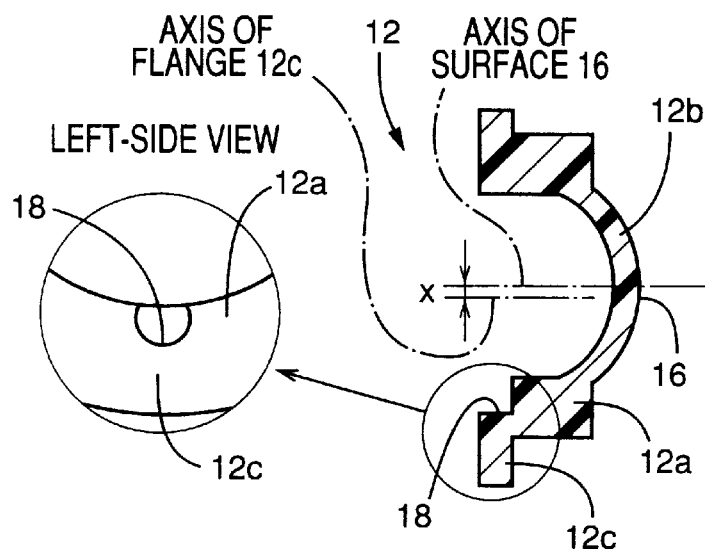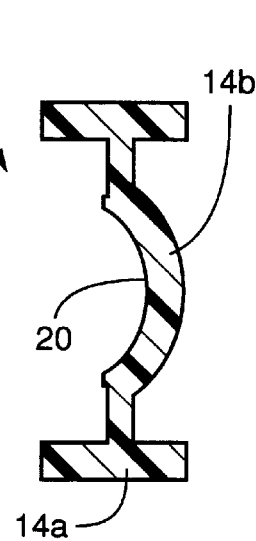
FIG. 3(a)　　　　FIG. 3(b)
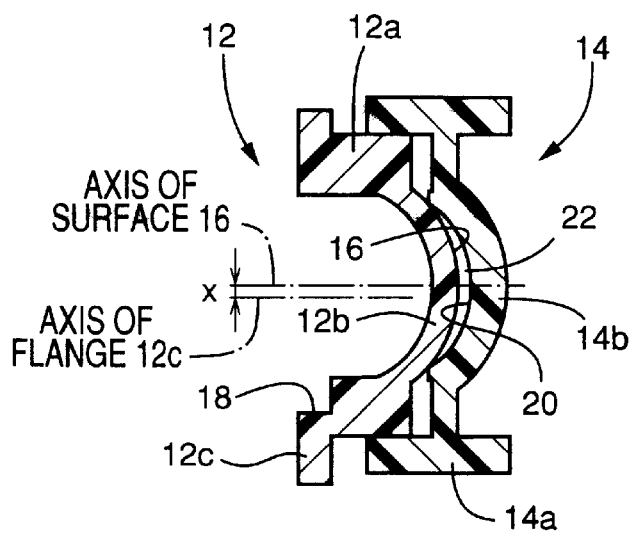
FIG. 4

U.S. Patent	Dec. 12, 2000	Sheet 3 of 3	6,158,861 under the number 6,158,861

PRISM BALLAST TYPE CONTACT LENS, METHOD OF PRODUCING THE SAME, AND MOLD ASSEMBLY USED IN PRODUCING THE LENS

The present application is based on Japanese Patent Application No. 10-56878 filed Mar. 9, 1998, the content of which is incorporated hereinto by reference.

BACKGROUND OF THE INVENTION

1. Field of the Invention

The present invention relates to a prism ballast type contact lens, a method of producing the same, and a mold assembly used in the method. More particularly, the invention is concerned with a method of producing such a contact lens in a simplified manner, a prism ballast type contact lens which is constructed to permit its production by that method, and a mold assembly used for producing the contact lens.

2. Discussion of the Related Art

As one example of contact lenses used for correction of astigmatism, or for correction of both of near and distant visions of the user, there is known a so-called "prism ballast type" contact lens which includes a front surface and a back surface, wherein the front surface has a center axis which is offset from that of the back surface defining a geometrical center axis of the lens, such that the contact lens has a thickness which continuously increases in a downward direction of the lens properly oriented in contact with the cornea of the user's eye. The prism ballast type contact lens further includes a slab-off area provided in at least a lower portion of the front surface.

FIGS. 1 and 2 show such a prism ballast type contact lens generally indicated at 2, wherein a back curved surface 4 is part-spherical or ellipsoidal following a profile of the cornea of the user's eye, and has a center axis A (FIG. 2) which is a geometric center axis of the contact lens 2, which is a center of a circle that defines the periphery of the lens, while a front curved surface 6 of the lens 2 is a toric or bifocal surface. In the contact lens 2, a center axis B (FIG. 2) of the front surface 6 is offset from the center axis A of the back surface 4 in the downward direction by a suitable distance, so that the lens 2 has a thickness which continuously increases in the downward direction of the lens 2 as placed on the eye with the desired rotational orientation. The contact lens 2 shaped to provide a ballast as described above is prevented from rotating on the cornea of the user's eye while the lens 2 is placed thereon.

In the contact lens of FIG. 2, at least a lower portion 8 of the front surface 6 is removed to reduce the thickness of the lens at that portion, and improve the wearing comfort of the lens as felt by the user, so that the contact lens 2 has a so-called "slab-off" area 10 having a part-spherical, conical or aspherical profile.

In general, the prism ballast type contact lens 2 as described above is produced mainly by: 1) a cutting operation wherein both of the opposite surfaces 4, 6 of the lens are formed by cutting, 2) a molding operation wherein both of the opposite surfaces 4, 6 of the lens are formed by molding, or 3) a combination of cutting and molding operations wherein one of the opposite surfaces 4, 6 of the lens is formed by cutting while the other surface is formed by molding. None of these methods, however, are satisfactory, since these methods require complicated and increased numbers of process steps in the manufacture of the lens, and largely depend on a high level of skill of the workers. Further, when both of the opposite surfaces of the lens are formed by the molding operation, it is necessary to prepare a large number of molds corresponding to respective specific different contact lenses, undesirably pushing up the cost of manufacture of the contact lens.

Described in detail, when both of the opposite surfaces 4, 6 of the prism ballast type contact lens 2 are produced by the cutting operation, the cut surfaces of the lens 2 are formed with dimensional accuracy higher than molded surfaces, i.e., the surfaces of the lens produced by molding, and exhibit excellent optical characteristics. This cutting method, however, requires complicated and cumbersome process steps, which include a step of forming the back surface 4 of the lens by using a precision lathe, a step of forming an optical portion of the front surface 6 of the lens, with the center axis of the front surface being offset by a suitable distance from the geometrical center axis of the lens, and a step of forming a slab-off area by cutting at least a lower portion of the front surface to reduce the thickness of the lens at that portion. This method not only requires cumbersome process steps of using the precision lathe, but also depends on the worker's skill to offset the center axis of the front surface from the geometrical center axis of the lens. This inevitably increases the burden of the worker, and causes an increase of a reject ratio, namely an increase in the number of defective products that must be rejected as being defective.

JP-A-57-98324 and U.S. Pat. No. 5,611,970 disclose examples of the method of producing the prism ballast type contact lens whose surfaces are formed by molding, using a mold assembly consisting of a male and a female mold half which cooperate to define a mold cavity having a profile following that of the intended prism ballast type contact lens. Described in detail, by polymerizing a suitable lens material filled in the mold cavity, the prism ballast type contact lens whose front and back surfaces have desired configurations is obtained. In this method, the mold cavity defined by the male and female mold halves should have a profile corresponding to that of the intended contact lens. Namely, a large number of various kinds of mold assemblies (male and female mold halves) need to be prepared depending upon the kinds of contact lenses having various configurations. Further, it is necessary to prepare and control an inventory of the large number of mold assemblies, inevitably increasing the cost of manufacture of the contact lens.

U.S. Pat. Nos. 4,113,224 and 5,110,278 disclose examples of the method of producing the prism ballast type contact lens, wherein one of the opposite surfaces of the lens is formed by cutting while the other surface is formed by molding. In this method, the intended prism ballast type contact lens is produced by first molding the back surface of the lens, then forming an optical portion of the front surface of the lens by cutting using the precision lathe, with the center axis of the front surface being offset by a suitable distance from the geometrical center axis of the lens, and finally forming a slab-off area by cutting at least a lower portion of the front surface of the lens for reducing the thickness of the lens at that portion. Though this method does not require a number of the mold assemblies to be prepared, it requires suitable means for offsetting the center axis of the front surface from the geometrical center axis of the lens to provide a desired ballast, using the precision lathe. In addition, it requires a high level of worker's skill to machine the front surface with its center axis being offset from the geometrical center axis of the lens while making good use of such offsetting means. This inevitably increases the burden of the worker, and results in an increase of the reject ratio, namely the ratio of the number of the defective products to the total number of the products manufactured.

SUMMARY OF THE INVENTION

It is therefore a first object of the present invention to provide a prism ballast type contact lens which can be produced in a simple process.

It is a second object of the invention to provide a method of producing the prism ballast type contact lens in a simplified manner without preparing and maintaining a large number of mold assemblies.

It is a third object of the invention to provide a mold assembly suitably used for forming a lens blank that will give the prism ballast type contact lens.

The above-indicated first object of the present invention may be attained according to a first aspect of the invention, which provides a prism ballast type contact lens having a front surface, and a back surface, a center axis of the front surface being offset from a center axis of the back surface which is a geometric center axis of the lens, such that the lens has a thickness which continuously increases in a downward direction of the lens, the lens further having a slab-off area provided in at least a lower portion of the front surface, wherein the improvement comprises: at least an optical portion of the back surface and at least the lower portion of the front surface in which the slab-off area is provided being formed by molding, and at least an optical portion of the front surface being formed by cutting.

The prism ballast type contact lens having the structure as described above can be manufactured in a considerably simplified manner with high production efficiency and reduced number of defective products, and at a relatively low cost, without imposing a serious burden on the worker engaged in the manufacture of the lens.

In a first preferred form of the above first aspect of the present invention, the prism ballast type contact lens is formed of a polymer or a copolymer obtained by polymerizing at least one ethylenically unsaturated monomer. The use of such a material permits easy production of the prism ballast type contact lens of the desired configuration.

The above-indicated second objects of the present invention may be attained according to a second aspect of the invention, which provides a method of producing a prism ballast type contact lens having a front surface and a back surface, a center axis of the front surface being offset from a center axis of the back surface which is a geometric center axis of the lens, such that the lens has a thickness which continuously increases in a downward direction of the lens, the lens further having a slab-off area provided in at least a lower portion of the front surface, the method comprising the steps of: preparing a mold assembly which has a mold cavity that gives a lens blank having a thickness sufficient to give at least an optical portion of the front surface by cutting, the mold cavity being defined by surfaces of the mold assembly, one of which gives at least an optical portion of the back surface and the other of which gives at least the lower portion of the front surface in which the slab-off area is provided; polymerizing a lens material which fills the mold cavity of the mold assembly, so as to provide the lens blank in which at least the optical portion of the back surface and at least the lower portion of the front surface are formed; and cutting the lens blank to form at least the optical portion of the front surface.

According to the present method described above, at least the optical portion of the back surface and at least the lower portion of the front surface in which the slab-off area is formed are obtained by molding. This arrangement eliminates otherwise required machining operations to form the desired back surface, and the desired slab-off area in the lower portion of the front surface. In other words, the cutting operation is effected only for forming the optical portion of the front surface, resulting in a considerably reduced number of the process steps and significantly increased efficiency of production of the contact lens.

In a first preferred form of the above second aspect of the present invention, the lens blank is cut to form the optical portion of the front surface while the lens blank is held by the mold assembly which is mounted on a cutting device.

In a second preferred form of the above second aspect of the present invention, at least a portion of the mold assembly is formed of a light-transmitting material, so that the lens material in the mold cavity is photopolymerized by a light transmitted through the portion of the mold assembly.

In a third preferred form of the above second aspect of the present invention, the lens material in the mold cavity is thermopolymerized.

The above-indicated third object of the present invention may be attained according to a third aspect of the invention, which provides a mold assembly including a male mold half and a female mold half which are assembled together to define a mold cavity which gives a lens blank by polymerization of a lens material which fills the mold cavity, the lens blank giving a prism ballast type contact lens having a front surface and a back surface, a center axis of the front surface being offset from a center axis of the back surface which is a geometric center of the lens, such that the lens has a thickness which continuously increases in a downward direction of the lens, the lens further having a slab-off area provided in at least a lower portion of the front surface, wherein the improvement comprises: the male mold half having a convex molding surface whose profile follows that of at least an optical portion of the back surface while the female mold half has a concave molding surface whose profile follows that of at least the lower portion of the front surface, the mold cavity being defined by the convex molding surface of the male mold half and the concave molding surface of the female mold half when the male and female mold halves are assembled together, so as to provide the lens blank having a thickness sufficient to give at least an optical portion of the front surface by cutting.

The mold assembly constructed as described above permits easy formation of the lens blank which will give the intended prism ballast type contact lens.

In a first preferred form of the above third aspect of the present invention, the male mold half has a flange at which the male mold half is fixed to a cutting device whose center axis is offset from a center axis of the convex molding surface of the male mold half on which the lens blank is held. When the male mold half is fixed at its flange to the cutting device, the center axis of the optical portion of the front surface of the lens can be easily and automatically offset from the geometrical center axis of the lens, i.e., the lens axis. This eliminates a conventionally required cumbersome cutting operation for the purpose of offsetting the center axis of the optical portion of the front surface of the lens from the geometrical center axis of the lens.

In a second preferred form of the above third aspect of the present invention, the male mold half includes positioning means by which the male mold half is positioned relative to the cutting device, so that the lens blank which is held on the convex molding surface of the male mold half is positioned on the cutting device with high accuracy, whereby the slab-off area is located at a desired circumferential position of said contact lens to be obtained.

According to this arrangement, the lens blank formed in the mold cavity can be easily positioned relative to the center axis of the cutting device when the male mold half is fixed at its flange to the cutting device, so that the cutting operation on the mold assembly and on the lens blank for forming the optical portion of the front surface of the intended contact lens can be effected with high accuracy.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which:

FIG. 3(a) is an elevational view in cross section of a male mold half of a mold assembly constructed according to one embodiment of the present invention, together with a fragmentary enlarged left-side view of the male mold half;

FIG. 3(b) is an elevational view in cross section of a female mold half of the mold assembly;

FIG. 4 is an elevational view in cross section showing the male and female mold halves in a closed state defining a mold cavity therebetween;

DETAILED DESCRIPTION OF THE PREFERRED EMBODIMENTS

Figure 1:
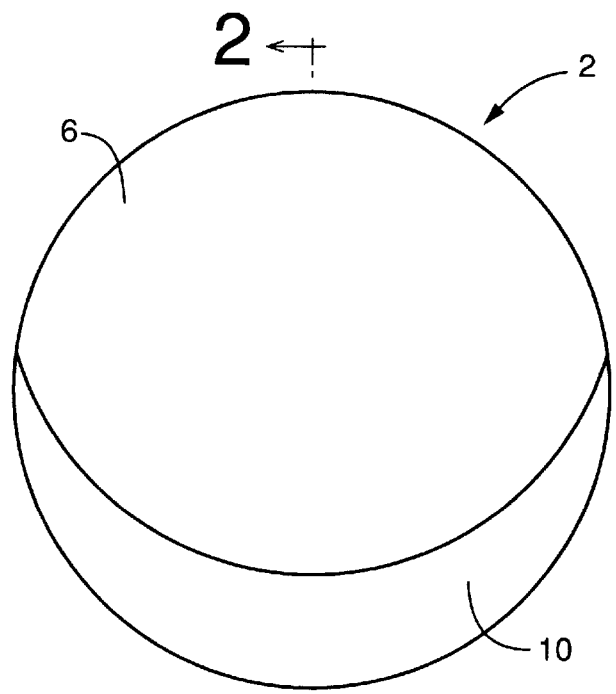
FIG. 1 is a plan view showing an example of a prism ballast type contact lens to which the present invention is applicable.
Figure 2:
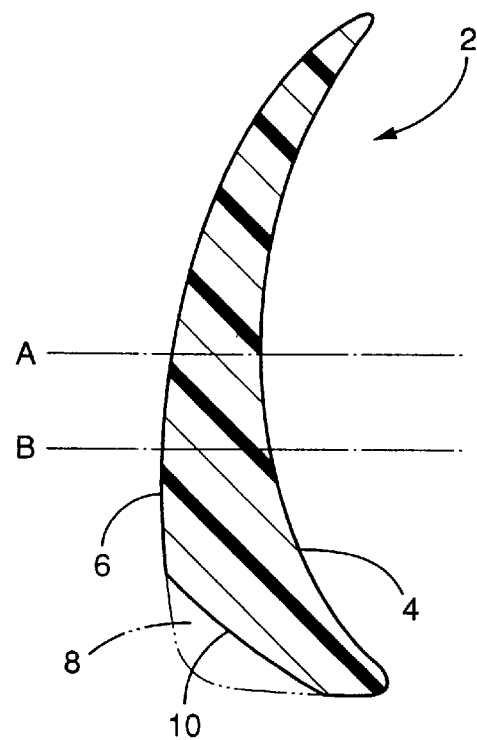
FIG. 2 is a cross sectional view of the contact lens of FIG. 1, taken along line 2—2 of FIG. 1.

Referring first to FIGS. 3(a) and 3(b), there is shown a mold assembly constructed according to one embodiment of the present invention. The mold assembly consists of a male mold half 12 shown in FIG. 3(a) and a female mold half 14 shown in FIG. 3(b), which male and female mold halves 12, 14 are closed together to define a mold cavity whose profile follows that of a lens blank 32 (FIG. 6) which gives an intended prism ballast type contact lens.

The male and female mold halves 12, 14 may be made of any known material. Generally, these mold halves 12, 14 are made of a synthetic resin material. Examples of the synthetic material to be used for forming the mold halves 12, 14 include polyolefine such as polyethylene and polypropylene, polystyrene, polycarbonate, polymethyl methacrylate, a copolymer of ethylene and vinyl alcohol, polyacetal, polyamide, polyester and polysulfone. Preferably, the mold halves 12, 14 are resin structures formed by injection molding using polypropylene. These mold halves 12, 14, which are used to form the lens blank 32, be preferably made of the resin material because the mold halves 12, 14 are subjected to a cutting operation, together with the lens blank 32, with the male mold half 12 being clamped by a chuck 30 of a lathe or a turning machine which will be described by reference to FIG. 6.

The male mold half 12 of the mold assembly includes: a thick-walled cylindrical portion 12a, a part-spherical convex portion 12b which closes one of opposite axial open ends of the cylindrical portion 12a and which protrudes axially outwardly from that axial end of the cylindrical portion 12a, and a flange 12c which protrudes radially outwardly from the other axial open end of the cylindrical portion 12a. The part-spherical convex portion 12b has a convex molding surface 16 whose profile follows that of at least an optical portion of the back surface 4 of the intended prism ballast type contact lens. The center axis of the convex molding surface 16, which is the geometric center axis of the lens to be obtained, in other words, the center axis of the optical portion of the back surface 4 of the lens to be obtained, is aligned with the center axis of the cylindrical portion 12a, while the center axis of the flange 12c, which passes the center of a circle whose periphery is defined by the outside diameter of the flange 12c, is offset from the center axis of the back surface of the lens by a suitable distance x, as indicated in FIG. 3(a). In the male mold half 12, a groove 18 is formed in the inner circumferential surface of the cylindrical portion 12a at the axial open end portion remote from the convex molding surface 16, for engagement with a positioning pin 36 (FIG. 6) provided on the chuck 30 of the cutting device which will be described. This groove 18 functions as positioning means by which the male mold half 12 is properly positioned in its circumferential direction relative to the cutting device, so that the lens blank 32 which is formed in the mold cavity 22 defined by the male and female mold halves 12, 14 is positioned on the cutting device with high positioning accuracy, whereby the slab-off area is properly located at a desired circumferential position of the contact lens to be obtained.

The female mold half 14 shown in FIG. 3(b) includes a cylindrical portion 14a and a part-spherical concave portion 14b which is formed integrally at a substantially axially intermediate portion of the inner circumferential surface of the cylindrical portion 14a. The part-spherical concave portion 14b has a concave molding surface 20 whose profile follows that of at least a lower portion of the front surface of the intended prism ballast type contact lens, in which the slab-off area is provided. The center axis of the concave molding surface 20 is aligned with the center axis of the cylindrical portion 14a.

The male and female mold halves 12, 14 constructed as described above are assembled together into a mold assembly as shown in FIG. 4 such that the inner circumferential surface of the cylindrical portion 14a of the female mold half 14 is partially fitted on the outer circumferential surface of the cylindrical portion 12a of the male mold half 12, to thereby define the mold cavity 22 between the two mold halves 12, 14. Described more specifically, the mold cavity 22 is defined by the convex molding surface 16 of the part-spherical convex portion 12b of the male mold half 12 and the concave molding surface 20 of the part-spherical concave portion 14b of the female mold half 14. The mold cavity 22 is dimensioned so that it gives the lens blank 32 which has a thickness sufficient to form by cutting at least the optical portion of the front surface of the intended contact lens. The convex molding surface 16 which partially defines the mold cavity 22 gives at least the optical portion of the back surface of the intended contact lens, while the concave molding surface 20 which partially defines the mold cavity 22 gives at least the lower portion of the front surface of the intended contact lens, in which the slab-off area is provided. In other words, at least the lower portion of the front surface (not necessarily the optical portion of the front surface 6 of the lens) is formed by molding.

The mold cavity 22 formed by closure of the male and female mold halves 12, 14 is filled with a suitable polymeric lens material which is polymerized by a known polymerization method, to thereby provide the lens blank 32 having at least the optical portion of the back surface of the intended contact lens and at least the lower portion of the front surface of the lens which has the slab-off area.

The lens material to be introduced into the mold cavity 22 is suitably selected from among any known liquid polymeric materials. The polymeric material to be used in the present embodiment preferably includes at least one conventionally used radically polymerizable ethylenically unsaturated monomer. Alternatively, the polymeric material may be composed of a macromer or a prepolymer of such a monomer, which is to be polymerized into a polymer or a copolymer that gives the lens blank. The monomer used as the polymeric material includes at least one of vinyl, allyl, acryl and methacryl groups in its molecule, and is conventionally used as a material for a hard contact lens or a soft contact lens. Examples of the monomer include: esters of (meth)acrylic acid such as alkyl (meth)acrylate, siloxanyl (meth)acrylate, fuluoroalky (meth)acrylate, hydroxyalkyl (meth)acrylate, polyethyleneglycol (meth)acrylate and polyhydric alcohol (meth)acrylate; derivatives of styrene; and N-vinyllactam. The polymeric material includes, as needed, a polyfunctional monomer as a cross-linking agent, such as ethyleneglycol di(meth)acrylate or diethyleneglycol di(meth)acrylate. The polymeric material further includes, as additives, a polymerization initiator such as thermopolymerization initiator or photopolymerization initiator, and a photosensitizer. The thus prepared polymeric material is used as the liquid lens material which fills the mold cavity 22 and is polymerized by a method known in the art.

Figure 5:
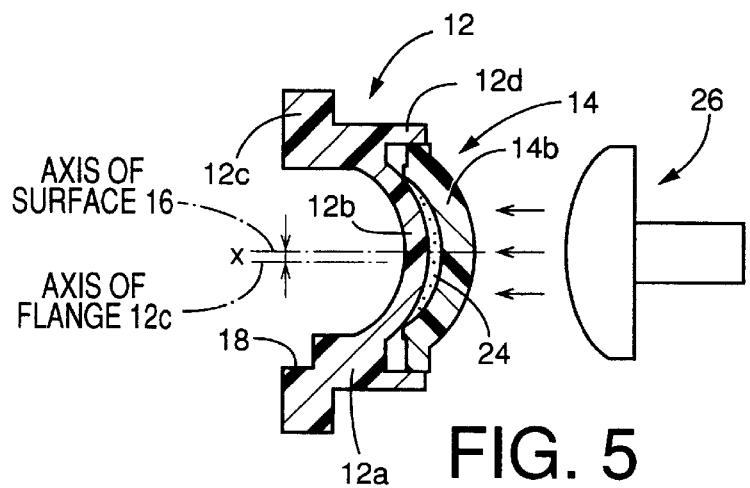
FIG. 5 is an elevational view in cross section showing a step of photopolymerizing a lens material filled in the mold cavity defined by the male and female mold halves of a mold assembly, which are constructed according to another embodiment of the present invention.

The thus prepared lens material is filled in the mold cavity 22 and polymerized according to a known thermopolymerization or a photopolymerization method. FIG. 5 schematically shows a process of the photopolymerization of the lens material generally indicated at 24, which has been introduced into the mold cavity 22 which is defined by closing the male and mold halves 12, 14. The lens material 24 in the mold cavity 22 is exposed to a ultraviolet radiation having a suitable wavelength generated by an external UV lamp 26, whereby the lens material 24 is polymerized to provide the intended lens blank 32. When the lens material 24 is polymerized by the photopolymerization using the ultraviolet radiation, at least a part of the mold assembly consisting of the male and female mold halves 12, 14 needs to be formed of a material which permits transmission of light. In the present embodiment, at least the female mold half 14 needs to be formed of such a light-transmitting material, so that the lens material 24 in the mold cavity 22 is polymerized by exposure to the light transmitted through the female mold half 14. It is noted that the male and female mold halves shown in FIG. 5 are constructed according to another embodiment of the present invention. Described more specifically, unlike the female mold half of FIG. 3(b), the female mold half 14 shown in FIG. 5 does not have the cylindrical portion 14a, while the male mold half 12 shown in FIG. 5 has a thin-walled portion 12d formed at the axial end of the cylindrical portion 12a on the side of the convex molding surface 16. The thus constructed male and female mold halves 12, 14 are closed together such that the outer circumferential surface of the part-spherical concave portion 14b of the female mold half 14 is fitted on the inner circumferential surface of the thin-walled portion 12d of the cylindrical portion 12a of the male mold half 12, whereby the mold cavity 22 is defined by the two mold halves 12, 14.

The lens blank 32 obtained by using the mold assembly (12, 14) constructed according to the present invention is subjected to a cutting operation for forming at least the optical portion of the front surface of the intended prism ballast type contact lens. The cutting operation on the molded surface of the lens blank 32, which surface gives the front surface of the intended lens, is effected by a suitable cutting device on which the mold assembly (12, 14) is mounted with the lens blank 32 being held on the mold assembly.

Figure 6:
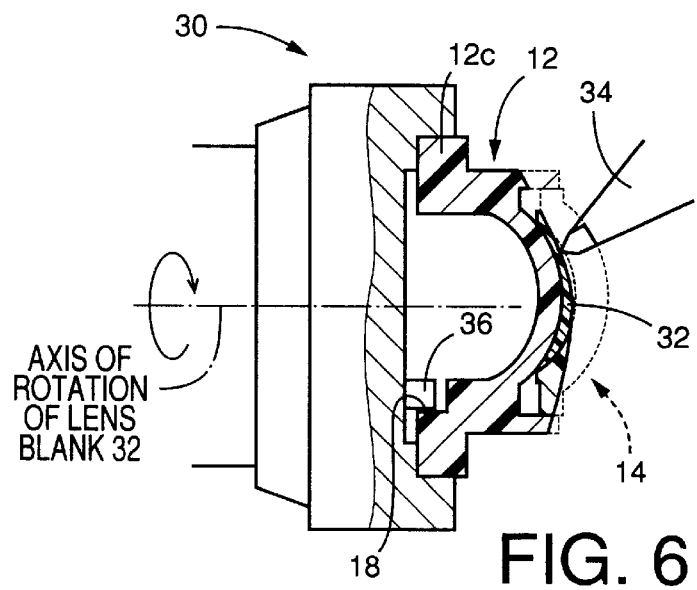
FIG. 6 is an elevational view in cross section showing a step of forming a front surface of the contact lens.

Described in detail by referring to FIG. 6, the mold assembly which holds the lens blank 32 is mounted on the cutting device such as a lathe or turning machine, such that the male mold half 12 is clamped at its flange 12c by the chuck 30. In this state, the chuck 30 is rotated about its axis, and the female mold half 14 and the lens blank 32 are subjected to a cutting operation by a cutting tool 34, to thereby form at least the optical portion of the front surface of the intended contact lens. In the present embodiment, the center axis of the flange 12c of the male mold half 12 is aligned with the rotating axis of the chuck 30 of the cutting device, i.e., the axis of the rotation of the lens blank 32. The center axis of the flange 12c is offset by a suitable distance from the center axis of the convex molding surface 16 of the male mold half 12, i.e., the geometrical center axis of the lens to be obtained. According to this arrangement, by simply fixing the flange 12c of the male mold half 12 to the chuck 30 of the cutting device, the lens blank 32 is positioned on the cutting device, with its center axis being properly offset from the rotating axis of the chuck 30, namely, the axis of rotation of the blank 32.

For effecting the cutting operation on the lens blank 32 in the present embodiment, the male mold half 12 is clamped at the flange 12c by the chuck 30 while the female mold half 14 is secured to the male mold half 12. In this case, the female mold half 14 is cut together with the lens blank 32 to form at least the optical portion of the front surface of the intended lens. Prior to the cutting operation, the female mold half 14 may be removed from the male mold half 12. Then, the male mold half 12 is clamped by the chuck 30 with the lens blank 32 being held on the convex molding surface 16. In this state, the lens blank 32 is subjected to the cutting operation to form at least the optical portion of the front surface of the intended lens. In either case, the male mold half 12 is clamped by the chuck 30 of the cutting device, such that the positioning pin 36 provided on the chuck 30 engages the groove 18 of the male mold half 12. According to this arrangement, the lens blank 32 is easily positioned on the cutting device with high accuracy, so that the slab-off area is located at the desired desired circumferential position of the contact lens to be obtained.

In the present embodiment, the cutting operation on the lens blank 32 is effected for forming at least the optical portion of the front surface of the intended prism ballast type contact lens. Described in detail, in the lens blank 32 formed by molding as described above, at least the optical portion of the back surface of the intended lens and at least the lower portion of the front surface of the lens in which the slab-off area is provided, have been shaped by the convex molding surface 16 of the male mold half 12 and the concave molding surface 20 of the female mold half 14, respectively. Accordingly to this arrangement, the cutting operation on the lens blank 32 for forming the prism ballast type contact lens is considerably simplified. In addition, the present arrangement does not require a high level of skill of the worker conventionally required to offset the center axis of the front surface from the center axis of the back surface of the lens to be obtained, i.e., from the geometrical center of the lens, for providing the lens with a desired ballast, to thereby reduce the burden of the worker. The present arrangement is also effective to lower the reject ratio, in other words, to reduce the number of defective products.

In the above arrangement wherein the male mold half 12 of the mold assembly is clamped at its flange 12c by the chuck 30 of the lathe so that the center axis of the flange 12c is aligned with the rotating axis of the chuck 30, the axis of rotation of the lens blank 32 is automatically offset from the center axis of the convex molding surface 16 of the male mold half 12. Accordingly, the cutting operation on the lens blank 32 for forming at least the optical portion of the front surface of the intended prism ballast type contact lens is easily effected while the lens blank 32 is held by the two mold halves 12, 14.

In the above embodiment, the center axis of the flange 12c which is aligned with the center of a circle whose periphery is defined by the outside diameter of the flange 12c is aligned with the rotating axis of the chuck 30. It is needless to say that the alignment of the axes of the flange 12c and the chuck 30 may be otherwise established. Similarly, the center axis of the front surface may be otherwise offset from the geometric center axis of the lens to provide the intended ballast. For example, the center axis of the convex molding surface 16 of the male mold half 12 may be offset from the rotating axis of the chuck 30, rather than the center axis of the flange 12c.

Figure 7:
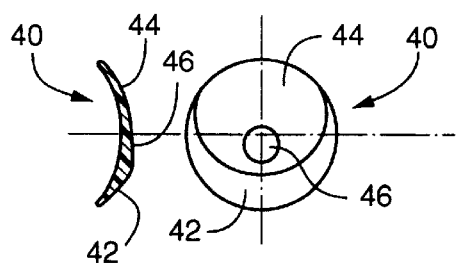
FIG. 7 is a combination of a plan view and a side elevational view in cross section of a prism ballast type contact lens constructed according to the present invention.

After the cutting operation on the lens blank 32 for forming at least the optical portion of the front surface of the intended contact lens, the mold assembly (12, 14) is removed from the chuck 30 of the lathe. Then, the lens blank 32 in which the desired front surface of the contact lens has been formed by the cutting operation is removed from the mold assembly, to thereby provide the intended prism ballast type contact lens 40 as shown in FIG. 7. The thus formed contact lens 40 can be easily removed from the mold assembly by immersing the mold assembly with the lens 40 in a suitable solvent, for instance. The obtained prism ballast type contact lens 40 shown in FIG. 7 is a bifocal lens, wherein a slab-off area 42 is formed in the lower portion of the front surface, and the optical portion of the front surface includes a distant vision correction area 44 and a near vision correction area 46. As is apparent from the side elevational view of FIG. 7, the center axis of the front surface of the lens 40 is offset from the center axis of the back surface, i.e., the geometrical center axis of the lens 40, so that the thickness of the lens 40 continuously increases in the downward direction as seen in FIG. 7, that is, in the downward direction of the lens 40 when it is properly oriented in contact with the cornea of the user's eye.

According to the present method described above, the prism ballast type contact lens can be advantageously produced in reduced number of process steps. Further, the molded lens blanks 32 may be produced in a large lot size and kept as a precursor for the lens 40 (end product), without the cutting operation being performed. Depending upon a demand for the lens 40, a suitable number of the lens blanks 32 are simply subjected to the cutting operation for forming the optical portion of the front surface, so that the demand may be easily met. When the molded lens blanks 32 before the cutting operation are stocked, the lens blanks 32 are classified depending upon its specifications. In the present embodiment, the lens blanks 32 are classified by simply considering the curvature of the back surface and the diameter of the lens to be obtained, since the specifications of the lens such as the power of the cylindrical axis of a toric lens, or the power distribution of the near and distant vision correction areas of a bifocal lens may be established later when the optical portion of the front surface is formed by the cutting operation. Accordingly, the present arrangement facilitates the inventory control of the lens blank 32.

While the present invention has been described in detail in its presently preferred embodiments, it is to be understood that the invention is not limited to the details of the illustrated embodiments, but may be otherwise embodied with various changes, improvements and modifications, which may occur to those skilled in the art, without departing from the scope of the attached claims.

For instance, the principle of the present invention is applicable to any known so-called "specialty lens" such as a bifocal lens, toric lens, multifocal lens, toric bifocal lens and toric multifocal lens.

The back surface and the slab-off area which is provided in the front surface of the present prism ballast type contact lens may have curved profiles similar to those of the known contact lens. The configurations of the convex molding surface 16 of the male mold half 12 and the concave molding surface 20 of the female mold half 14 are shaped to give those curved profiles.

The location of the slab-off area of the present prism type contact lens is not limited to the lower portion of the front surface. For instance, the slab-off area may extend from the lower portion of the front surface in the circumferential direction over a suitable circumferential distance, so as to assume a crescent shape as shown in FIGS. 1 and 7. The slab-off area may extend over the entire circumference of the contact lens, to provide an annular shape. Further, two separate slab-off areas may be provided at the lower and upper portions of the front surface of the lens, respectively.

The offset distance "x" of the center axis of the flange 12c of the male mold half 12 from the geometrical center axis of the contact lens, in other words, the offset distance of the center axis of the front surface from that of the back surface, is suitably determined depending upon the specific characteristics required for the intended prism type contact lens. In general, the offset distance "x" is preferably in a range of 0.05–0.5 mm.

What is claimed is:

1. A prism ballast type contact lens having a front surface and a back surface, a center axis of said front surface being offset from a center axis of said back surface which is a geometric center axis of said lens, such that said lens has a thickness which continuously increases in a downward direction of said lens, said lens further having a slab-off area provided in at least a lower portion of said front surface, wherein the improvement comprises:

at least an optical portion of said back surface and at least said lower portion of said front surface in which said slab-off area is provided being formed by molding, and at least an optical portion of said front surface being formed by cutting.

2. A contact lens according to claim 1 being formed of a polymer or a copolymer obtained by polymerizing at least one ethylenically unsaturated monomer.

3. A method of producing a prism ballast type contact lens having a front surface and a back surface, a center axis of said front surface being offset from a center axis of said back surface which is a geometric center axis of said lens, such that said lens has a thickness which continuously increases in a downward direction of said lens, said lens further having a slab-off area provided in at least a lower portion of said front surface, said method comprising the steps of:

preparing a mold assembly which has a mold cavity that gives a lens blank having a thickness sufficient to give at least an optical portion of said front surface by cutting, said mold cavity being defined by surfaces of said mold assembly, one of which gives at least an optical portion of said back surface and the other of which gives at least said lower portion of said front surface in which said slab-off area is provided;

polymerizing a lens material which fills said mold cavity of said mold assembly, so as to provide said lens blank in which said optical portion of said back surface and said lower portion of said front surface are formed;

positioning said lens blank relative to a cutting device such that a center axis of a molded surface of said lens blank which gives said lens blank surface and said lens is offset from a rotation axis of said cutting device; and operating said cutting device to cut said lens blank to form said optical portion of said front surface.

4. A method according to claim 3, wherein said lens blank is cut to form said optical portion of said front surface while said lens blank is held by said mold assembly which is mounted on a cutting device.

5. A method according to claim 3, wherein at least a portion of said mold assembly is formed of a light-transmitting material, so that said lens material in said mold cavity is photopolymerized by a light transmitted through said portion of said mold assembly.

6. A method according to claim 3, wherein said lens material in said mold cavity is thermopolymerized.

7. A mold assembly including a male mold half and a female mold half which are assembled together to define a mold cavity which gives a lens blank by polymerization of a lens material which fills said mold cavity, said lens blank giving a prism ballast type contact lens having a front surface and a back surface, a center axis of said front surface being offset from a center axis of said back surface which is a geometric center axis of said lens, such that said lens has a thickness which continuously increases in a downward direction of said lens, said lens further having a slab-off area provided in at least a lower portion of said front surface, wherein the improvement comprises:

said male mold half having a convex molding surface whose profile follows that of at least an optical portion of said back surface while said female mold half has a concave molding surface whose profile follows that of at least said lower portion of said front surface in which said slab-off area is provided, said mold cavity being defined by said convex molding surface of said male mold half and said concave molding surface of said female mold half when said male and female mold halves are assembled together, so as to provide said lens blank having a size sufficient to give at least an optical portion of said front surface by cutting.

8. A mold assembly according to claim 7, wherein said male mold half has a flange at which said male mold half is fixed to a cutting device whose center axis is offset from a center axis of said convex molding surface of said male mold half on which said lens blank is held.

9. A mold assembly according to claim 8, wherein said center axis of said cutting device is offset from said center of axis of said convex molding surface of said male mold half by a distance of 0.05–0.5 mm.

10. A mold assembly according to claim 7, wherein said male mold half includes positioning means by which said male mold half is positioned relative to said cutting device, so that said lens blank which is held on said convex molding surface of said male mold half is positioned on said cutting device, whereby said slab-off area is located at a desired circumferential position of said contact lens to be obtained.

* * * * *